(12) United States Patent
Corem et al.

(10) Patent No.: US 7,574,073 B2
(45) Date of Patent: Aug. 11, 2009

(54) OPTICAL DEVICES WITH INTEGRAL ISOLATORS

(75) Inventors: Yossi Corem, Beit Shemesh (IL); Gil Cohen, Livingston, NJ (US)

(73) Assignee: Xtellus, Inc., Morris Plains, NJ (US)

( * ) Notice: Subject to any disclaimer, the term of this patent is extended or adjusted under 35 U.S.C. 154(b) by 0 days.

(21) Appl. No.: 12/048,373

(22) Filed: Mar. 14, 2008

(65) Prior Publication Data

US 2008/0226216 A1      Sep. 18, 2008

Related U.S. Application Data

(60) Provisional application No. 60/918,050, filed on Mar. 15, 2007.

(51) Int. Cl.
*G02B 6/00* (2006.01)
(52) U.S. Cl. .............................. 385/11; 385/16; 385/17; 385/18
(58) Field of Classification Search .................... 385/11, 385/18, 16, 17
See application file for complete search history.

(56) References Cited

U.S. PATENT DOCUMENTS

| 6,690,846 B2 * | 2/2004 | Zhou et al. ..................... 385/15 |
| 2005/0111785 A1 * | 5/2005 | Zhao et al. ..................... 385/16 |

FOREIGN PATENT DOCUMENTS

WO          2007/029260          3/2007

* cited by examiner

*Primary Examiner*—Ellen Kim
(74) *Attorney, Agent, or Firm*—Darby & Darby

(57) ABSTRACT

An isolator assembly, for use internally within a multi-port optical switch, and which operates on a preselected number of input port channels. The assembly incorporates a sequence of a birefringent crystal with a half wave plate on part of its output face acting as a linear polarizer, a 45° Faraday rotator element and a half wave plate aligned at 22.5° to the polarization direction of the light rotated by the Faraday rotator. This arrangement ensures that any light spuriously returned from a reflective beam switching element of the switch is blocked from transmission out of the paths of light which the isolator assembly covers because of the orientation of the light polarization returned to the birefringent crystal. The isolator assembly is arranged such that it does not cover the beam path leading to the output port or ports, such that legitimate output beams are transmitted unhindered.

21 Claims, 4 Drawing Sheets

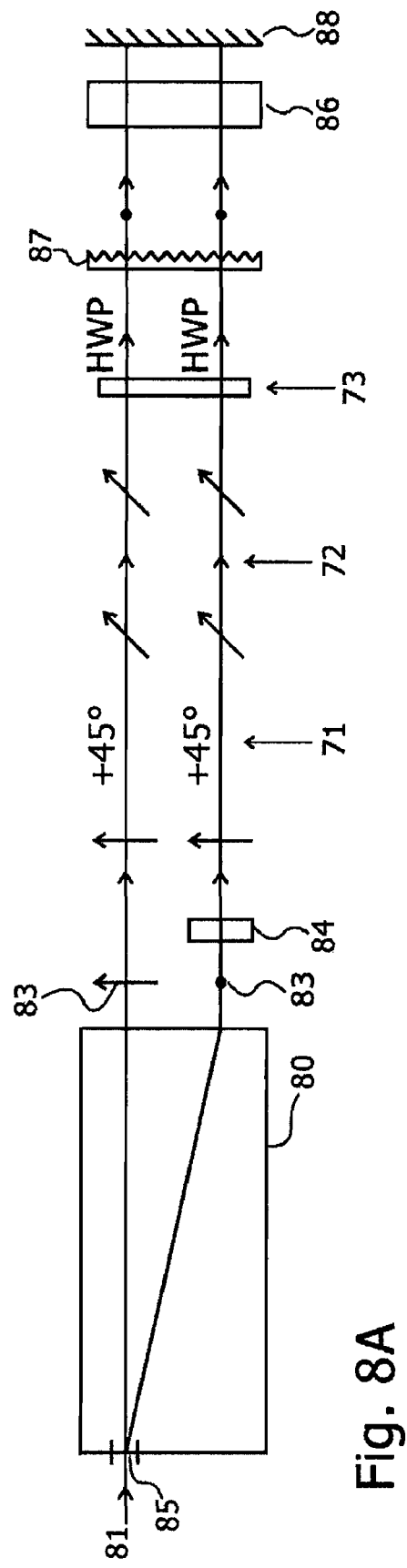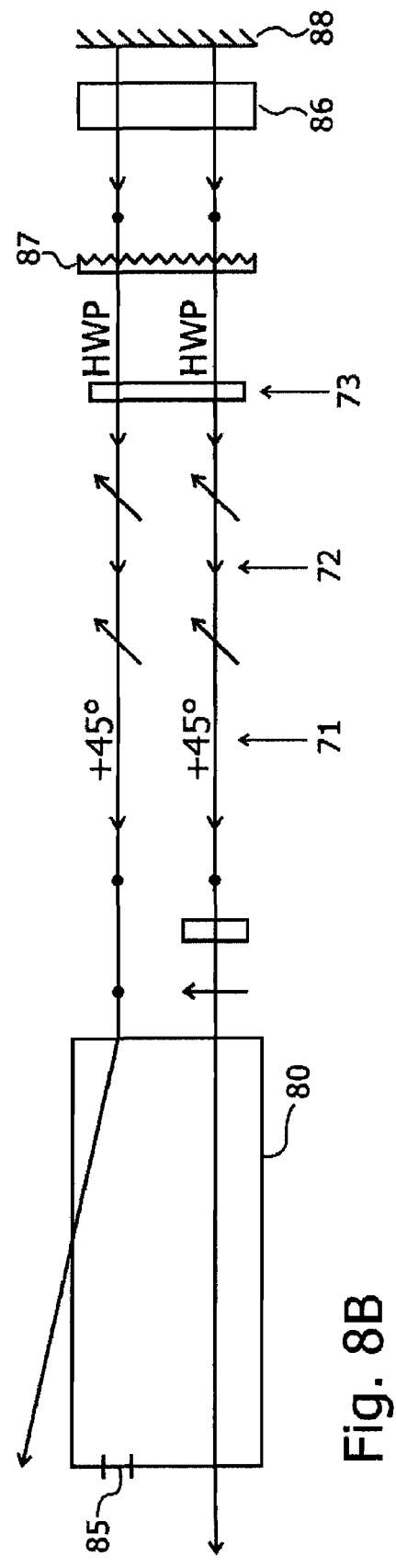

OPTICAL DEVICES WITH INTEGRAL ISOLATORS

CROSS REFERENCE TO RELATED APPLICATIONS

This application claims the benefit of U.S. Provisional Patent Application No. 60/918,050 filed on Mar. 15, 2007, the disclosure of which is incorporated herein by reference in its entirety.

FIELD OF THE INVENTION

The present invention relates to the field of multi-port optical switching devices, especially optical wavelength selective routers for use as switches or channel blockers in optical communication systems.

BACKGROUND OF THE INVENTION

Multi-port optical switching devices generally have multiple inputs and outputs, from and to which optical signals can be switched. Wavelength selective routers or wavelength selective switches (WSS) are typical examples of such devices. A number of WSS devices have been described in the prior art. In co-pending U.S. patent application, Ser. No. 12/066,249, having common inventors with the current application, and herewith incorporated by reference in its entirely, there is described a WSS in which a signal on one or more of several input ports is switched to a common output port, or vice versa. In common with other WSS designs, the switching process takes place in free space propagation of the manipulated light signals.

The switch structure described in application Ser. No. 12/066,249 utilizes conversion, preferably by the use of birefringent crystals, of optical signals input to any port of the switch, to light beams having a defined polarization, preferably linear, and which are mutually disposed in a predetermined plane with respect to the system plane in which optical manipulation of the beam traversing the WSS is to be performed. The beams are spatially wavelength-dispersed preferably by means of a diffraction grating. The light is then directed through a polarization rotation device, preferably a liquid crystal (LC) cell pixelated along the wavelength dispersive direction, such that each pixel operates on a separate wavelength. When the appropriate control voltage is applied to a pixel, the polarization of the light signal passing through that pixel is rotated, thereby blocking, transmitting or attenuating the particular wavelength channel passing through that pixel.

After beam polarization rotation, the light passing through each pixel is angularly deflected using a reflective beam steering element. The beam steering element is pixelated along the wavelength dispersive direction, such that each beam steering pixel also operates on a separate wavelength. When the appropriate control voltage is applied to a beam steering pixel, the wavelength component associated with that liquid crystal pixel is steered by the beam steering pixel towards its desired direction. The beam steering element can be any miniature element which is capable of controlling the direction of reflection of beams impinging thereon. Typical WSS's can use either an MEMS array, or an LCOS array, or a stack of serially disposed liquid crystal arrays and prismatic polarization separators disposed in front of a reflecting surface.

The steering of the beam through each individual pixel enables light of different wavelengths, after being transmitted or attenuated, to be directed to different output ports, according to the various paths defined by the beam steering angles. Additionally, the light of a specific wavelength can be blocked, in which case the beam steering is unused.

A typical multi-input to single output switch configuration, shown schematically in FIG. 1 as a "black box" WSS 12, has several input signal ports, 1 to 6 in the example shown, each signal being input through a collimator 11, which could be part of a collimator array, and a single output port 16. The WSS 12 is controlled to switch the pixels of the polarization rotation device 13 and of the pixelized beam steering device 14, shown in the embodiment of FIG. 1 as a MEMS mirror array, such that any one of these six input signals can be directed to the output port 16 as required. For clarity, the angular geometry of the WSS in FIG. 1 has been exaggerated in order to illustrate the different angles of incidence on the beam steering device from the different ports. However, for any switching configuration designed to transmit a specific input port to the output, the MEMS reflector element orientation may be such that another input signal is reflected to output from the device at another input port. Thus for instance, in the example shown in FIG. 1, while the input signal at port 1 is being switched by reflection in the appropriately aligned MEMS mirror pixel, to the output port 16, the angle of that particular MEMS mirror pixel may be such that an input signal at port 2 may be switched to input port 4. Such an output appearing at input port 4 would be an undesirable, spurious output, and a method is needed for preventing it. Other spurious output signals may occur while each beam is being steered by the beam steering device, and may be inadvertently coupled to another of the input ports as it sweeps across the switch, and this would generate an undesirable transient spurious signal in that port. In the above-referenced application Ser. No. 12/066,249, methods are described for generating a hit-less switching configuration, by adjusting the transmissivity of the polarization rotation device in the optical paths leading to undesired ports, such that output to them is blocked as the steered beam passes over them. However, this method is not applicable for preventing the previously mentioned spurious outputs arising from non-transient reflections, i.e. arising from legitimate back reflections from an unselected input port to an unselected output port.

A method, commonly used in prior art switches, of avoiding all such spuriously directed signals, and especially back reflected signals from unwanted paths, is to insert an isolator 18 at every input port, such that a signal can be input to a particular input port, but signals cannot be output therefrom. However, this involves the use of an additional component for every input port, this involving additional cost and in particular, additional space in the WSS module. Furthermore, conventional discrete isolators can be polarization dependent, such that the transmission of the device may vary with the orientation of the input polarization.

There therefore exists a need for a new optical, multi-pole, multi-way wavelength selective switch structure having a simple optical structure, and operative without the need for external isolators on each of the input ports, and having polarization independence.

The disclosures of each of the publications mentioned in this section and in other sections of the specification, are hereby incorporated by reference, each in its entirety.

SUMMARY OF THE INVENTION

The present disclosure describes a novel optical beam switching device incorporating an internal isolator assembly, disposed within the free propagation space of the device and which operates on the input channels of the switching device.

The switching device may be implemented as a reflective wavelength selective switch. A first example of the switching device has a sequence of two linear polarizers aligned with their preferred polarization axes at 45° to each other, with a 45° polarization rotation device, such as a Faraday rotator, disposed between them, such as is known from conventional isolator design. The three operative elements making up the assembly are positioned to cover the free space propagation paths of all of the input beams, but not the path to the output port. This assembly ensures that any light returned from the reflective beam steering element of the device back down an input path, is blocked, because the polarization state of the returned light is rotated such that it is orthogonal to the input polarizer preferred direction. An advantage of the arrangement of these elements to cover the free space propagation paths of all of the input beams is that it enables the isolation properties to be applied to all the input beams at once, thereby obviating the need to install individual isolators at each of the fiber input ports to the WSS. The elements are arranged such that they do not cover the beam path leading to the output port or ports, such that legitimate output beams are transmitted unhindered. This described switching device thus ensures that, using internally integrated elements, no output beam can be coupled spuriously out of an unintended input port.

Another example involves an internal isolator assembly with a sequence of a Faraday rotator (the Faraday rotator being generally used in this application as an example of a polarization rotation device, though other polarization rotators could equally well be used in the described switches), followed by a linear polarizer and a half wave plate aligned at an angle of 22.5 deg. to the preferred polarization axis of the linear polarizer. These elements are disposed after the output from the birefringent walk-off crystal or crystals used to generate the polarization diversity that defines the polarization direction for achieving optimum efficiency from the optical switching mechanism of the switch, for those switches using a high efficiency grating, which has a specific preferred polarization axis. The isolator assembly ensures that light reflected towards the output port, (in the case of a WSS, from the beam steering element), is prevented from being output back to any of the input ports, by rotating the polarization direction of the returned light such that it is birefracted through the walk-off crystal on its return path, at a angle that prevents it from being propagation out of an input port. Additionally, the arrangement of the internal isolator thus described has polarization independence, since the elements follow a polarization diversity generating device, such as a birefringent walk-off crystal.

Although the examples are described in this application in terms of their use in a WSS, it is to be understood that they could be equally applicable to any multi-port optical device using input polarization processing and in which signals are transmitted from selected input ports to selected output ports.

According to further aspects of the present invention, there is described an optical switch comprising:
(i) a plurality of input ports,
(ii) at least one output port,
(iii) at least one polarization diversity device receiving light from one of the input ports and oriented to transmit linearly polarized light within the optical switch, and
(iv) a polarization rotator receiving the linearly polarized light and adapted to rotate its polarization direction through essentially 45°, wherein the polarization rotator is disposed such that it covers the free space propagation paths within the switch of light passing through the input ports, but not the free space propagation paths within the switch of light passing through the at least one output port.

According to one example of such a switch, the light returned from a reflective switching element of the switch is blocked from transmission along the paths within the switch of light passing through the input ports. Another example of the switch may include a linear polarizer disposed at the output of the polarization rotator, the linear polarizer being aligned such that its polarization axis is parallel to the polarization direction of the light received from the polarization rotator. Yet a further example may comprise a linear polarizing element disposed between the at least one polarization diversity device and the polarization rotator, and oriented with its polarization axis aligned parallel to the polarization direction of the light output from the at least one polarization diversity device.

Additionally, another exemplary switch may be as described above, and further including:
(vi) a linear polarizing element disposed between the at least one polarization diversity device and the polarization rotator, the linear polarizing element being oriented with its polarization axis aligned parallel to the polarization direction of the light output from the at least one polarization diversity device, and
(vii) a linear polarizer disposed at the output of the polarization rotator, the linear polarizer being oriented such that its polarization axis is rotated by essentially 45° in the same direction as the rotation direction of the polarization rotator, to the polarization axis of the linear polarizing element.

In any of the above described switches, the at least one polarization diversity device may be a birefringent crystal with a half wave plate over part of its optical output.

Furthermore, such switches may also incorporate a second half wave plate receiving light from the polarization rotator, the second half wave plate being aligned such that its optical axis makes an angle of essentially 22.5° with the polarization direction of the light received from the polarization rotator. Such a switch with a second half wave plate may also be constructed to include a linear polarizer disposed between the polarization rotator and the second half wave plate, with its polarization axis aligned parallel with the polarization direction of the light output from the polarization rotator.

According to further aspects of the invention, there is provided an optical switch comprising:
(i) a plurality of input ports,
(ii) a birefringent crystal having a half wave plate over part of its optical output, receiving an input beam of light from one of the input ports, and outputting linearly polarized beams of light,
(iii) a 45° polarization rotator receiving the linearly polarized beams of light and rotating the polarization directions thereof by 45°, and
(iv) a reflective switching element adapted to reflect the 45° rotated polarized beams,
(v) wherein light returned from the reflective switching element and re-entering the birefringent crystal is birefracted in a direction different from that of the input beam of light.

This latter switch may advantageously include a linear polarizer disposed at the output of the polarization rotator, the linear polarizer being aligned such that its polarization axis is parallel to the polarization direction of the 45° rotated polarized beams output from the polarization rotator. Alternatively, it may include a linear polarizing element disposed between the birefringent crystal and the polarization rotator, and oriented with its polarization axis aligned parallel to the polarization direction of the light output from the birefringent crystal.

Additionally, another exemplary switch may be like the switch described in these further aspects of the invention, and also including:

(vi) a linear polarizing element disposed between the birefringent crystal and the polarization rotator, the linear polarizing element being oriented with its polarization axis aligned parallel to the polarization direction of the light output from the birefringent crystal, and (vii) a linear polarizer disposed at the output of the polarization rotator, the linear polarizer being aligned such that its polarization axis is parallel to the polarization direction of the 45° rotated polarized beams output from the polarization rotator.

Any of the above described switches, according to these further aspects of the invention, may also incorporate a second half wave plate receiving light from the polarization rotator, the second half wave plate being aligned such that its optical axis makes an angle of essentially 22.5° with the polarization direction of the 45° rotated polarized beams output from the polarization rotator. Such an example may further include a linear polarizer disposed between the polarization rotator and the second half wave plate, with its polarization axis aligned parallel with the polarization direction of the 45° rotated polarized beams output from the polarization rotator. Additionally, in such an example, the second half wave plate may be such as to rotate the polarization direction of the 45° rotated polarized beams output from the polarization rotator, by a further 45°.

In any of the above described exemplary switches, the polarization rotator may be a Faraday rotator.

In this application, in order to improve the clarity of the disclosure, an attempt has been made to delineate between the polarization direction of the light at any point, and the angular orientation of the various linear polarizers used, by generally referring to the light as having a polarization "direction", meaning the plane of polarization of the light, as opposed to the linear polarizers, which are described as having a polarization "axis", or a preferred polarization axis. This polarization axis is, of course, to be distinguished from the beam axis of the polarizer.

BRIEF DESCRIPTION OF THE DRAWINGS

The present invention will be understood and appreciated more fully from the following detailed description, taken in conjunction with the drawings in which:

FIGS. 8A and 8B illustrate how the polarization of the light passing through the array of FIG. 7 is affected to enable the array to operate as an internal isolator, with FIG. 8A showing the input path and FIG. 8B the output path.

DETAILED DESCRIPTION OF PREFERRED EMBODIMENTS

Figure 2:
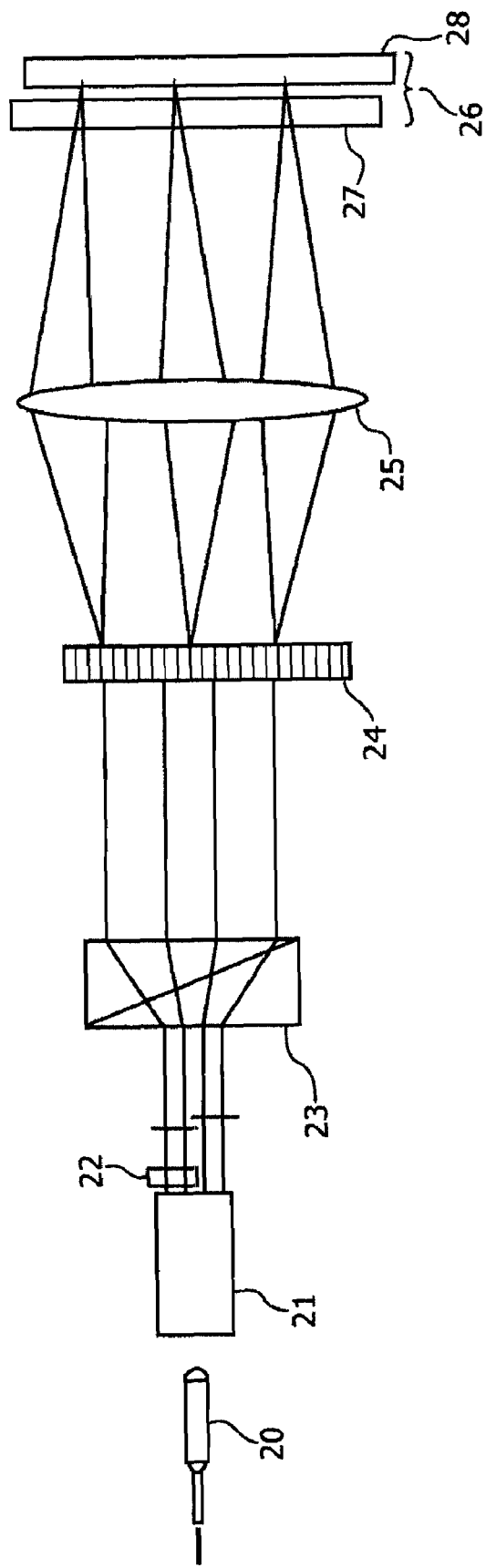
FIG. 2 illustrates schematically the structure of a prior art reflective wavelength selective router.

Reference is now made to FIG. 2, which is a schematic plan view of a prior art reflective wavelength selective router, such as that shown in U.S. application Ser. No. 12/066,249. This device is used as an exemplary multi-port optical switching device to illustrate the construction and operation of an integral isolator described in this disclosure, and is not intended to limit the invention to such a WSS. FIG. 2 shows the plan view layout of a single channel path of the router. The input beam of each port is typically input at a fiber interface block, or at individual input collimators 20 which accept the input signals and convert them into free-space beams for polarization processing, such as by use of a birefringent walk-off crystal 21, typically a $YVO_4$ crystal with a half wave plate 22 over part of its output face. The output of each channel thus incorporates a pair of beams having the same polarization direction, as indicated by the vertical line on each of the beam outputs. After this polarization decomposition and conversion, these beams are then laterally expanded, shown in FIG. 2 by an anamorphic prism pair 23. These laterally expanded beams are passed to a grating 24 for wavelength dispersion. The grating may be a high efficiency grating, which requires predefined polarization directions of the beams for optimum efficiency. The dispersed wavelength components are then directed to a lens 25 for focusing on the beam steering module 26. The beams of each wavelength channel are first polarization switched, such as by a pixilated liquid crystal (LC) array 27, to achieve the desired transmission state for that channel, either a blocked, or a fully transmitted or an attenuated transmission state. After the appropriate beam processing by the LC array, the beam is then passed to the reflective beam steering device 28, operative to reflect each switched and steered beam back down the router to the desired output position of the birefringent crystal, and from there to the output collimator port. This steering is performed in the direction perpendicular to the plane of the drawing.

Figure 1:
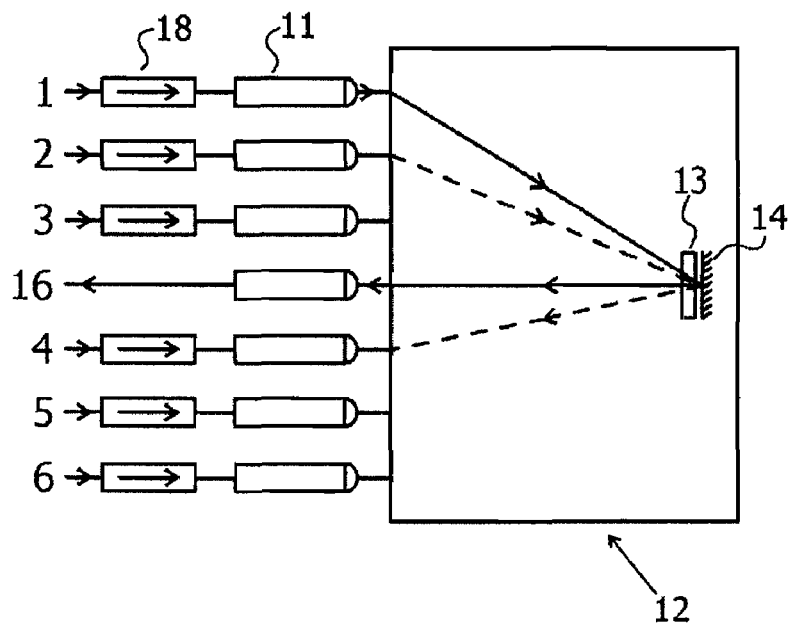
FIG. 1 (described hereinabove) illustrates schematically a prior art multi-input to single output switch configuration, shown schematically as a "black box" WSS.
Figure 3:
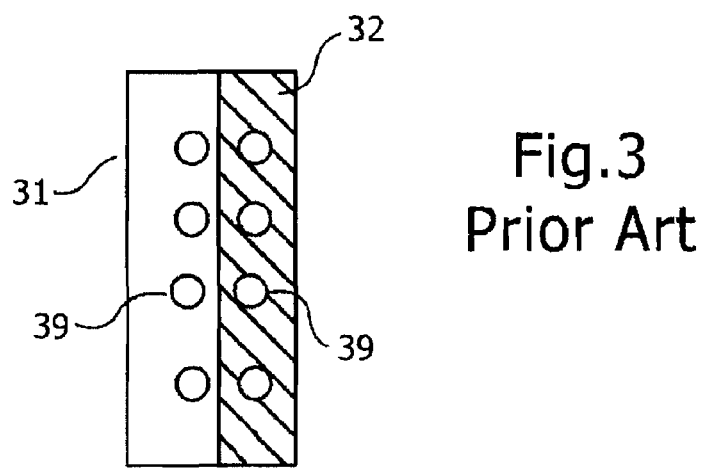
FIG. 3 shows schematically an end view of the birefringent walk-off crystal of the prior art WSS of FIG. 2.

Reference is now made to FIG. 3, which shows schematically an end view of the birefringent walk-off crystal 31 of FIG. 2, with its half-wave plate 32. The beam positions are seen after decomposition of each input beam into the two side-by-side beams 39 having the predefined polarization directions. In the example shown in FIG. 2, the beam steering is performed out of the plane of the drawing, hence the vertical line of beam positions seen in FIG. 3, one pair for each channel. Four channels are shown in this described example.

Figure 4:
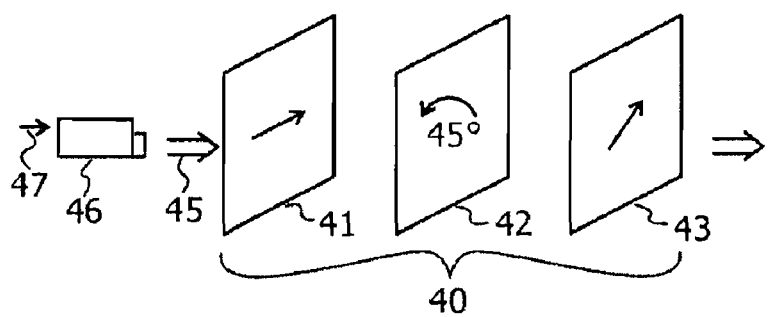
FIG. 4 illustrates schematically, according to some aspects of the present invention, a serial array of polarization manipulating optical elements, which constitute an internal isolator for the WSS

Reference is now made to FIG. 4 which illustrates an example optical isolator assembly 40 embodying aspects of the present invention, made up of a serial array of polarization manipulating optical elements, inserted into the beam path 45 of one input port 47 of the WSS example shown in FIG. 2. In the example shown, the serial array of polarization manipulating elements is disposed after the birefringent walk-off crystal 46 but before the beam expansion, in order to use minimally sized components. These elements enable the WSS to operate without external isolators on the input ports.

The elements used in the assembly of FIG. 4 are, similarly to those used in conventional discrete optical isolators, sequentially a first linear polarizer 41, a Faraday rotator 42 providing a 45° polarization rotation, and a second linear polarizer 43 oriented with its preferred axis lined up with the polarization direction generated by passage of the light through the Faraday rotator, which is at 45° to the preferred direction of the first linear polarizer. It is to be emphasized that when a rotation angle or polarization direction angle is mentioned in this application, such as the 45° angle used here and the 22.5° alignment angle mentioned in connection with the examples of FIGS. 7 and 8A/B, it is not intended to limit the claimed invention to exactly those values, but rather that the values used are those understood in the art to characterize elements having nominally those angular properties or orientations.

Figure 5:
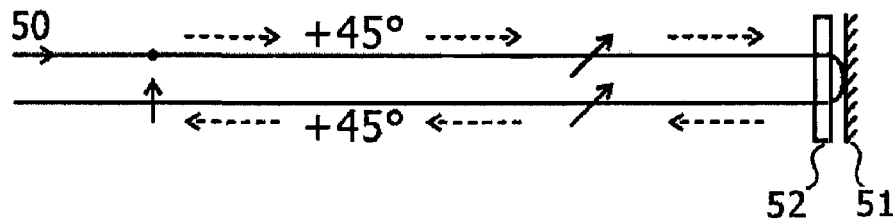
FIG. 5 illustrates how the polarization of the light passing through the array of FIG. 4 is affected to enable the array to operate as an internal isolator.

The action of this serial arrangement of elements on the polarization direction of the light traversing the WSS and being reflected back along its input path is shown in FIG. 5. The incoming light 50 is shown in this example as having a polarization directed out of the plane of the drawing. After passage through the Faraday rotator, the polarization direction is rotated through 45°, and passes essentially unattenuated through the second polarizer which is aligned with the 45° polarization direction of the light. The beam then traverses a beam expander, the dispersion element and any focusing elements, none of which are shown in FIG. 5 though their disposition is clear from FIG. 2, and undergoes reflection in the beam steering element 51. After reflection, the light again passes through the second polarizer unattenuated, (assuming its polarization direction is unchanged after reflection). It then passes through the Faraday rotator, where its polarization direction is rotated a further 45° in the same direction as the rotation imparted during its input path. However, this additional 45° rotation now causes the light to have a polarization direction orthogonal to that of the input polarizer, such that it is blocked from traversing the input polarizer. The arrangement of the elements of FIG. 4 thus operates as an internal isolator, allowing passage of the input polarized light, but blocking its return to the port. Since the internal isolator is arranged to cover the paths to all of the input ports, this isolator action also takes place for light returned by the reflective element from any input port to another input port, if the angle of the reflector element required for this path happens to be the same as the angle set by the reflective element for correctly directing light from the selected input port to the output port. The internal isolator elements are disposed such that the isolator does not intervene in the output port path, such that all signals directed to the output port path are transmitted therethrough essentially unattenuated.

According to another implementation, since the internal isolator arrangement described in this disclosure is often used with a birefringent walk-off crystal with half wave plate over one output path, 46, the first linear polarization element 41 can be omitted without significantly affecting the operation of the internal isolator, since the polarization direction of the light entering the isolator assembly is determined by the birefringent crystal with half wave plate.

In other exemplary implementations, the second linear polarization element 43 can also be omitted without significantly affecting the operation of the internal isolator, since the nature of the propagation of the light within the WSS described is such that, other than an intentional polarization shift arising from a switching operation itself 52, there should be no significant polarization direction change in passage through the reflective switching module of the switch. This is in distinction to the output polarizer in a conventional discrete optical isolator, where its function is to neutralize the effect of polarization changes occurring to light before it re-enters the isolator in the reverse direction, since these polarization changes could be substantial. Therefore, the second linear polarization element 43 in this exemplary implementation becomes largely superfluous, and its omission may result only in a slightly reduced isolation ratio, because of any residual polarization rotation occurring in the reflective switching module.

Figure 6:
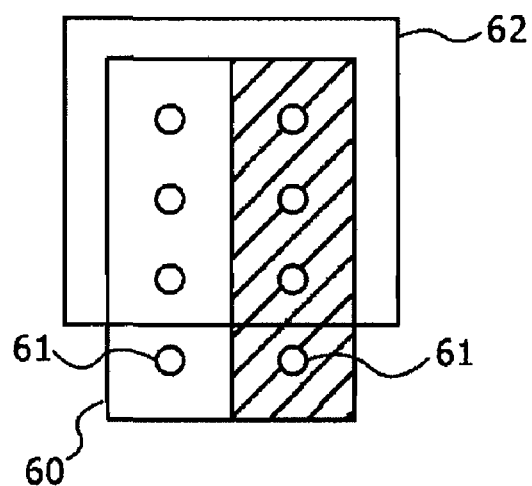
FIG. 6 shows schematically the internal isolator arrangement of FIGS. 4 and 5 as applied to the end of the birefringent walk-off crystal shown in the end-view of FIG. 3.

Reference is now made to FIG. 6 which shows schematically the various beam path positions shown on the end view of the birefringent walk-off crystal 60 and how the internal isolator arrangement of FIGS. 4 and 5 is positioned over these beam path positions. In FIG. 6, it is assumed that the upper three paths are used as input channels and the fourth path 61 as the output channel of the WSS. The internal isolator elements 62 are positioned such that they cover just the upper three paths and isolate the transmission of light out of the WSS through these three input paths, such that back reflection that would reduce port isolation is eliminated. Therefore, any spurious light signal which impinges on these three path positions will not be transmitted out of the WSS. Only the light directed out of the path 61 intended for the output port is transmitted without the effects of isolation. For clarity in the drawings, only a 3 to 1 switch is shown in the exemplary embodiments illustrating this invention. However, it is to be understood that other implementations could involve switches having a larger number of ports. Additionally, the output port need not be at one end of the array, as shown in FIG. 6, but it could be in the central part of the array, in which case the internal isolator arrangement will be constructed in two parts instead of the one part shown in FIG. 6.

Figure 7:
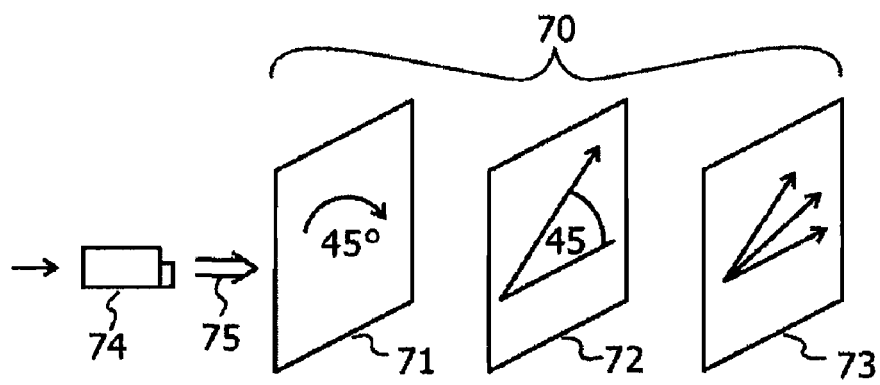
FIG. 7 illustrates schematically a serial array of polarization manipulating optical elements, according to another example illustrating the present invention, for providing internal isolation properties to the desired channels of the WSS of FIG. 2.

Reference is now made to FIG. 7, which is a schematic illustration of another exemplary optical isolator assembly 70. This example uses an alternative serial array of elements for providing internal isolation properties to the desired channels of a multi-port switch, in this exemplary case, a WSS. The input signals 75 with the polarizations aligned such that the WSS operates correctly using a high efficiency LPD grating, may be supplied by a birefringent walk-off crystal, 74, as shown in more detail in FIGS. 8A and 8B. The first element of the isolator assembly is a Faraday rotator 71, followed by a linear polarizer 72 aligned at 45° to the input polarization direction, and finally a half wave plate (HWP) 73 with its optical axis oriented at 22.5 deg to the polarization axis of the linear polarizer 72. This orientation of the HWP is such that it rotates the polarization 45° before the beams impinge on the grating at the correct orientation for ensuring high efficiency operation of the grating.

The action of this serial arrangement of elements on the polarization directions of the light traversing the WSS is shown in FIGS. 8A and 8B. FIGS. 8A and 8B are plan views of a single channel of a switch such as a WSS, with the other wavelength channels being disposed perpendicular to the plane of the drawing. IN FIGS. 8A and 8B, the location of the polarization manipulation elements 71, 72 and 73 of FIG. 7 are indicated on the optical paths. FIG. 8A shows the polarization of the pair of beams of one input port, traversing the internal isolator assembly between the exit from the birefringent walk-off crystal 80 until impingement on the polarization rotation element 86 and the reflective beam steering array 88 of the WSS. As with FIGS. 4 and 5, not all of the intervening additional components of the WSS are shown. FIG. 8B shows the polarization of a pair of output beams traversing in the reverse direction, after beam steering, back towards the birefringent walk-off crystal 80.

In FIG. 8A, the input beam 81 is shown entering the birefringent walk-off crystal 80 in the region of its input port 85, and forming two output beams 83. After passage of one of these beams through a half wave plate 84 at the output face of the birefringent walk-off crystal, both beams now have the same polarization direction. In the example shown in FIG. 8A, this direction is in the plane of the drawing. The polarizations are rotated through 45° by passage through the Faraday rotator (71 of FIG. 7). Because the linear polarizer (72 of FIG. 7) has its preferred polarization axis aligned at 45° to the polarization direction of the input light, passage through it leaves the light essentially unattenuated. Passage through the half wave plate (73 of FIG. 7) aligned with its optical axis at 22.5 deg to the polarization axis of the polarizer, rotates the polarizations a further 45° such that they are now perpendicular to the plane of the drawing, before impinging on the grating 87, and ultimately on the polarization rotation element 86 and the reflective beam steering array 88 of the WSS.

Reference is now made to FIG. 8B which shows the return path of the beams after steering by the beam steering array 88 and passage through the polarization rotation element 86 and the grating 87. For the purposes of this illustrated example, it is assumed that the pixels of the polarization rotation array are set so that they do not affect the polarization of the beams passing through. On passage through the half wave plate 73, the light is rotated back 45°, such that it is now again at 45° and passes through the linear polarizer, 72 of FIG. 7, essentially unattenuated. On traversing the Faraday rotator 71 in the output direction, the polarization is rotated a further 45° in the same direction as the rotation imparted during its input path, such that it is now aligned orthogonally to the input polarization direction, i.e. perpendicular to the plane of the drawing. On return through the birefringent crystal 80, this polarization is such that the light of both beams is refracted in directions such that neither of them leaves the birefringent walk-off crystal in the region and direction of the input port 85. The birefringent walk-off crystal thus blocks output light from being directed back onto an input port. Thus the arrangement of FIG. 7 operates as an internal isolator, allowing passage of input polarized light from the birefringent walk-off crystal, but blocking its return through the crystal. The path coverage shown in FIG. 6 is also valid for the exemplary arrangement of FIG. 7 and FIGS. 8A-B.

In another example, the linear polarization element 72 of FIG. 7 can be omitted without significantly affecting the operation of the internal isolator, since the input polarization of the light is determined by the polarization diversity of the birefringent crystal, and the operation of the dispersing and switching elements are such that the polarization changes induced are essentially only those intended by the switching mechanism itself. The polarization changes introduced by the isolator assembly may thus be determined solely by the Faraday rotator and the HWP aligned at 22.5 deg. to the zero axis of the Faraday rotator.

Although the various examples of the integral isolator in this disclosure are described as having multiple input ports and one output port, it is feasible to adapt the integral isolator to operate on a multi-pole switch having more than one output, so long as the operative optical components of the isolator assembly cover paths from the relevant input ports only.

It is appreciated by persons skilled in the art that the present invention is not limited by what has been particularly shown and described hereinabove. Rather the scope of the present invention includes both combinations and subcombinations of various features described hereinabove as well as variations and modifications thereto which would occur to a person of skill in the art upon reading the above description and which are not in the prior art.

We claim:

1. An optical switch comprising:
 a plurality of input ports;
 at least one output port;
 at least one polarization diversity device receiving input light from one of said input ports and oriented to transmit linearly polarized light within said optical switch;
 a polarization rotator receiving said linearly polarized light and adapted to rotate its polarization direction through essentially 45°; and
 a switchable reflective element receiving said input light after passage through said polarization rotator, and adapted to reflect said light such that it impinges only on a preselected one of said at least one output port,
 wherein said polarization rotator is disposed such that it covers the free space propagation paths within said switch of light passing through said input ports, but not the free space propagation paths within said switch of light passing through said at least one output port.

2. An optical switch according to claim 1 and wherein said polarization rotator is a Faraday rotator.

3. An optical switch according to claim 1 and wherein light returned from said switchable reflective element of said switch is blocked from transmission along said paths within said switch of light passing through said input ports.

4. An optical switch according to claim 1, further comprising a linear polarizer disposed at the output of said polarization rotator, said linear polarizer being aligned such that its polarization axis is parallel to the polarization direction of said light received from said polarization rotator.

5. An optical switch according to claim 1, further comprising a linear polarizing element disposed between said at least one polarization diversity device and said polarization rotator, and oriented with its polarization axis aligned parallel to the polarization direction of said light output from said at least one polarization diversity device.

6. An optical switch according to claim 1, further comprising:
 a linear polarizing element disposed between said at least one polarization diversity device and said polarization rotator, said linear polarizing element being oriented with its polarization axis aligned parallel to the polarization direction of said light output from said at least one polarization diversity device; and
 a linear polarizer disposed at the output of said polarization rotator, said linear polarizer being oriented such that its polarization axis is rotated by essentially 45° in the same direction as the rotation direction of said polarization rotator, to the polarization axis of said linear polarizing element.

7. An optical switch according to claim 1 and wherein said at least one polarization diversity device comprises a birefringent crystal with a half wave plate over part of its optical output.

8. An optical switch according to claim 1 further comprising a second half wave plate receiving light from said polarization rotator, said second half wave plate being aligned such that its optical axis makes an angle of essentially 22.5° with the polarization direction of said light received from said polarization rotator.

9. An optical switch according to claim 8 further comprising a linear polarizer disposed between said polarization rotator and said second half wave plate, with its polarization axis aligned parallel with the polarization direction of said light output from said polarization rotator.

10. An optical switch comprising:
- a plurality of input ports;
- a birefringent crystal having a half wave plate over part of its optical output, receiving an input beam of light from one of said input ports, and outputting said input beam of light as linearly polarized beams of light;
- a polarization rotator receiving said linearly polarized beams of light and rotating the polarization directions thereof by essentially 45°; and
- a switchable reflective element receiving said linearly polarized beams of light after passage through said polarization rotator,
- wherein said linearly polarized beams of light received at said switchable reflective element, have a polarization after passage through said polarization rotator, rotated from that of said linearly polarized light received by said polarization rotator, and light returned from said switchable reflective element and re-entering said birefringent crystal is birefracted in a direction different from that from which said input beam of light was received.

11. An optical switch according to claim 10, further comprising a linear polarizer disposed at the output of said polarization rotator, said linear polarizer being aligned such that its polarization axis is parallel to the polarization direction of said 45° rotated polarized beams output from said polarization rotator.

12. An optical switch according to claim 10, further comprising a linear polarizing element disposed between said birefringent crystal and said polarization rotator, and oriented with its polarization axis aligned parallel to the polarization direction of said light output from said birefringent crystal.

13. An optical switch according to claim 10, further comprising:
- a linear polarizing element disposed between said birefringent crystal and said polarization rotator, said linear polarizing element being oriented with its polarization axis aligned parallel to the polarization direction of said light output from said birefringent crystal; and
- a linear polarizer disposed at the output of said polarization rotator, said linear polarizer being aligned such that its polarization axis is parallel to the polarization direction of said 45° rotated polarized beams output from said polarization rotator.

14. An optical switch according to claim 10 further comprising a second half wave plate receiving light from said polarization rotator, said second half wave plate being aligned such that its optical axis makes an angle of essentially 22.5° with the polarization direction of said 45° rotated polarized beams output from said polarization rotator.

15. An optical switch according to claim 14 further comprising a linear polarizer disposed between said polarization rotator and said second half wave plate, with its polarization axis aligned parallel with the polarization direction of said 45° rotated polarized beams output from said polarization rotator.

16. An optical switch according to claim 14, wherein said second half wave plate rotates the polarization direction of said 45° rotated polarized beams output from said polarization rotator, by a further 45°.

17. An optical switch according to claim 10 and wherein said polarization rotator is a Faraday rotator.

18. An optical switch according to claim 1 and wherein said input light received at said switchable reflective element, after passage through said polarization rotator, has a polarization rotated from that of said linearly polarized light received by said polarization rotator.

19. An optical switch according to claim 1 and wherein light received from an input port other than that from which said input light is received is blocked from being directed by said switch to any of said plurality of input ports and said at least one output port.

20. An optical switch according to claim 1 and wherein said polarization rotator is a non-variable polarization rotator.

21. An optical switch according to claim 10 and wherein said polarization rotator is a non-variable polarization rotator.

* * * * *